United States Patent
Sasaki et al.

(10) Patent No.: US 12,140,694 B2
(45) Date of Patent: Nov. 12, 2024

(54) RADAR BASED TARGET-TYPE VEHICLE DETECTION

(71) Applicant: Aptiv Technologies AG, Schaffhausen (CH)

(72) Inventors: Sho Sasaki, Kanagawa (JP); Othmane Tamri, Kanagawa (JP); Louis Okuma Hallerdt, Kanagawa (JP)

(73) Assignee: Aptiv Technologies AG, Schaffhausen (CH)

( * ) Notice: Subject to any disclaimer, the term of this patent is extended or adjusted under 35 U.S.C. 154(b) by 189 days.

(21) Appl. No.: 17/659,483

(22) Filed: Apr. 16, 2022

(65) Prior Publication Data
US 2022/0334220 A1 Oct. 20, 2022

(30) Foreign Application Priority Data
Apr. 16, 2021 (JP) ................. 2021-069773

(51) Int. Cl.
| | | |
|---|---|---|
| G01S 7/41 | (2006.01) | |
| B60Q 9/00 | (2006.01) | |
| G01S 13/931 | (2020.01) | |
| G08G 1/16 | (2006.01) | |

(52) U.S. Cl.
CPC ............. *G01S 7/412* (2013.01); *B60Q 9/008* (2013.01); *G01S 13/931* (2013.01); *G08G 1/167* (2013.01); *G01S 2013/9315* (2020.01)

(58) Field of Classification Search
CPC .............. G01S 7/142; G01S 13/931; G01S 2013/9315; B60Q 9/008; G08G 1/167
See application file for complete search history.

(56) References Cited

U.S. PATENT DOCUMENTS

| | | |
|---|---|---|
| 9,994,151 B2 | 6/2018 | Lai et al. |
| 10,380,439 B2 | 8/2019 | Biemer et al. |
| 10,591,919 B1 | 3/2020 | Dolgov et al. |
| 10,916,144 B2 | 2/2021 | Kang |

(Continued)

FOREIGN PATENT DOCUMENTS

| | | |
|---|---|---|
| EP | 2106968 A2 | 10/2009 |
| EP | 2936197 B1 | 8/2018 |

(Continued)

OTHER PUBLICATIONS

"Extended European Search Report", EP Application No. 22168844.3, Sep. 12, 2022, 10 pages.

*Primary Examiner* — George C Jin
(74) *Attorney, Agent, or Firm* — Harness, Dickey & Pierce, P.L.C.

(57) ABSTRACT

A method of identifying target-type vehicle through radar based blind spot warning (BSW) system of a host vehicle, comprising: detecting a first radar reflection point reflected by an object, said first radar reflection point being outside the BSW zone of the BSW system; setting an object area based on the distribution of groups of the first radar reflection point; assuming the object to be other vehicle based on the positional relationship between the object area and the BSW zone; detecting a second radar reflection point inside the BSW zone; and determining the other vehicle to be the target-type vehicle based on the detected second radar reflection point. The target-type vehicle is trailer or coach.

22 Claims, 8 Drawing Sheets

(56) References Cited

U.S. PATENT DOCUMENTS

| | | | |
|---|---|---|---|
| 2009/0243822 A1* | 10/2009 | Hinninger | B60Q 9/008 340/435 |
| 2016/0101730 A1* | 4/2016 | Shehan | G01S 17/931 340/431 |
| 2016/0252610 A1* | 9/2016 | Smith | G01S 7/411 342/27 |
| 2016/0274228 A1 | 9/2016 | Cashler | |
| 2017/0124881 A1* | 5/2017 | Whitehead | B60Q 9/008 |
| 2019/0189015 A1* | 6/2019 | Gesch | B60W 30/09 |
| 2020/0062277 A1 | 2/2020 | Kim et al. | |
| 2021/0221363 A1* | 7/2021 | Lai | G08G 1/165 |

FOREIGN PATENT DOCUMENTS

| | | |
|---|---|---|
| JP | 2005145196 A | 6/2005 |
| KR | 20180047656 A | 5/2018 |

\* cited by examiner

RADAR BASED TARGET-TYPE VEHICLE DETECTION

CROSS-REFERENCE TO RELATED APPLICATION

This application claims priority to Japanese Patent Application Number 2021-069773, filed Apr. 16, 2021, the disclosure of which is hereby incorporated by reference in its entirety herein.

FIELD

This disclosure relates to technology for detecting proximity of driving vehicle of specific type, with radar device. This vehicle of specific type particularly comprises large sized trailer or coach.

BACKGROUND

In the prior art, a vehicle can use radar based blind spot warning (BSW) system to detect neighboring vehicle entering into blind spot of rear mirror, such that a warning can be provided for operation such as lane change. However, this radar based BSW system does not yet have a capability of detecting a large sized truck trailer driving near the host vehicle. Taking reference to FIG. 2, when a large-sized trailer is driving in a lane adjacent to the host vehicle, since the chassis of the trailer is higher than the host vehicle, its reflection of radar signal may be different from a regular vehicle, thus the BSW system cannot identify a large sized trailer appearing nearby.

Patent document US20160274228A1 has disclosed a system to distinguish a trailer being towed by host vehicle and other vehicle appearing nearby, therefore it is prevented to detect the presence of other vehicle when only the towed trailer is present. In the system disclosed by US20160274228A1, radar signal emitted by radar apparatus is used to detect signal representing an object approximate to the host vehicle. Based on this signal, the time when the trailer is connected with the host vehicle is determined, and the area shaded by the trailer towed by host vehicle is defined. In this way, the object detected in this area can be omitted. However, this technology cannot solve the problem set forth above.

SUMMARY

This invention is therefore achieved in views of the above aspect. It is intended to enable BSW system to utilize on-vehicle radar device to detect proximity of other vehicle of specific type, such as truck trailer or coach.

According to one aspect of this invention, a method of identifying target-type vehicle through radar based blind spot warning (BSW) system of a host vehicle is proposed, the method comprising: detecting a first radar reflection point reflected by an object, said first radar reflection point being outside the BSW zone of the BSW system; setting an object area based on the distribution of groups of the first radar reflection point; assuming the object to be other vehicle based on the positional relationship between the object area and the BSW zone; detecting a second radar reflection point inside the BSW zone; and determining the other vehicle to be the target-type vehicle based on the detected second radar reflection point.

Further, in the above method, wherein determining the other vehicle to be target-type vehicle comprises determining the other vehicle to be target-type vehicle when the second radar reflection point is outside the object area.

Further, in the above method, wherein determining the other vehicle to be target-type vehicle comprises determining the other vehicle to be target-type vehicle when the second radar reflection point satisfies a first predetermined condition, said first predetermined condition comprise the distance between the second radar reflection point and the object area is longer than a specific distance, said specific distance is ½ of the length of the object area along the moving direction of the host vehicle, or ½ of the length of the object area along the direction perpendicular to the moving direction of the host vehicle.

Further, in the above method, wherein the height of the bottom surface of the target-type vehicle between its front wheels and rear wheels is higher than the height of radar apparatus of the BSW system equipped on the host vehicle.

Further, in the above method, wherein the area of the bottom surface of the target-type vehicle defined by its front wheels and rear wheels is broader than the BSW zone.

Further, in the above method, wherein the target-type vehicle is trailer or coach.

Further, in the above method, wherein assuming the object to be other vehicle comprises: assuming the object to be other vehicle when the positional relationship between the object area and the BSW zone satisfies specific positional relationship, said specific positional relationship comprises at least one of a first positional relationship, a second positional relationship, a third positional relationship, a fourth positional relationship, a fifth positional relationship, in the first positional relationship, the object area is behind the BSW zone of the host vehicle, in the second positional relationship, the object area is in front of the BSW zone, in the third positional relationship, the object area is at a side of the BSW zone opposite to the host vehicle, in a fourth positional relationship, the object area is at a side of the BSW zone opposite to the host vehicle and in oblique front of the BSW zone, and in the fifth positional relationship, the object area is at a side of the BSW zone opposite to the host vehicle and in oblique rear of the BSW zone.

Further, in the above method, wherein said specific positional relationship satisfies at least two of the first through fifth positional relationships.

Further, in the above method, wherein said specific positional relationship is: based on a prerequisite that the first positional relationship is satisfied, further determined that either of the third and fifth positional relationships is satisfied.

Further, in the above method, wherein assuming the object to be other vehicle comprises: assuming the object to be other vehicle based on the relative speed of the first radar reflection point with respect to the host vehicle.

Further, in the above method, wherein detecting the second radar reflection point comprises: determining, among the reflection points detected inside the BSW zone, specific interference point satisfying a second predetermined condition, said second predetermined condition comprise at least one of: an electromagnetic wave intensity of the reflection wave from the second reflection point is less than a first threshold, a distance alteration rate of the reflection wave from the second reflection point is substantially zero, angle accuracy index of reflection waves from second radar reflection point is the worst; and excluding the specific interference point from the second radar reflection point.

Further, in the above method, wherein detecting the second radar reflection point comprises: determining reflection point corresponding to reflected wave intermittently detected.

Further, in the above method, wherein detecting the second radar reflection point comprises: determining the second radar reflection point having characteristics of radar reflection wave reflected by a bottom surface of a vehicle chassis higher than the mounting height of radar of host vehicle.

According to another aspect of this invention, a driving assistance system is proposed, said system comprising: a radar based blind spot warning (BSW) system mounted on the vehicle, said system comprising a processing unit to: detect a first radar reflection point reflected by an object, said first radar reflection point being outside the BSW zone of the BSW system; set an object area based on the distribution of groups of the first radar reflection point; deduce the object to be other vehicle based on the positional relationship between the object area and the BSW zone; detect a second radar reflection point inside the BSW zone; determine the other vehicle to be target-type vehicle based on the detected second radar reflection point; and driving assistance ECU, said ECU is to receive signal from the BSW system, and based on said signal, notify the driver of the situation that the object being a target-type vehicle.

Further, in the above driving assistance system, wherein determining the other vehicle to be target-type vehicle comprises determining the other vehicle to be target-type vehicle when the second radar reflection point is outside the object area.

Reference signs: 6 blind spot warning zone; 10 host vehicle; 12 vehicle body; 14 on-vehicle radar apparatus; 18 transmission area; 20 other vehicle; 22 zero plane; 24 chassis/bottom surface; 26 target-type vehicle; 100 on-vehicle system; 300 processing unit.

DETAILED DESCRIPTION

Figure 1:
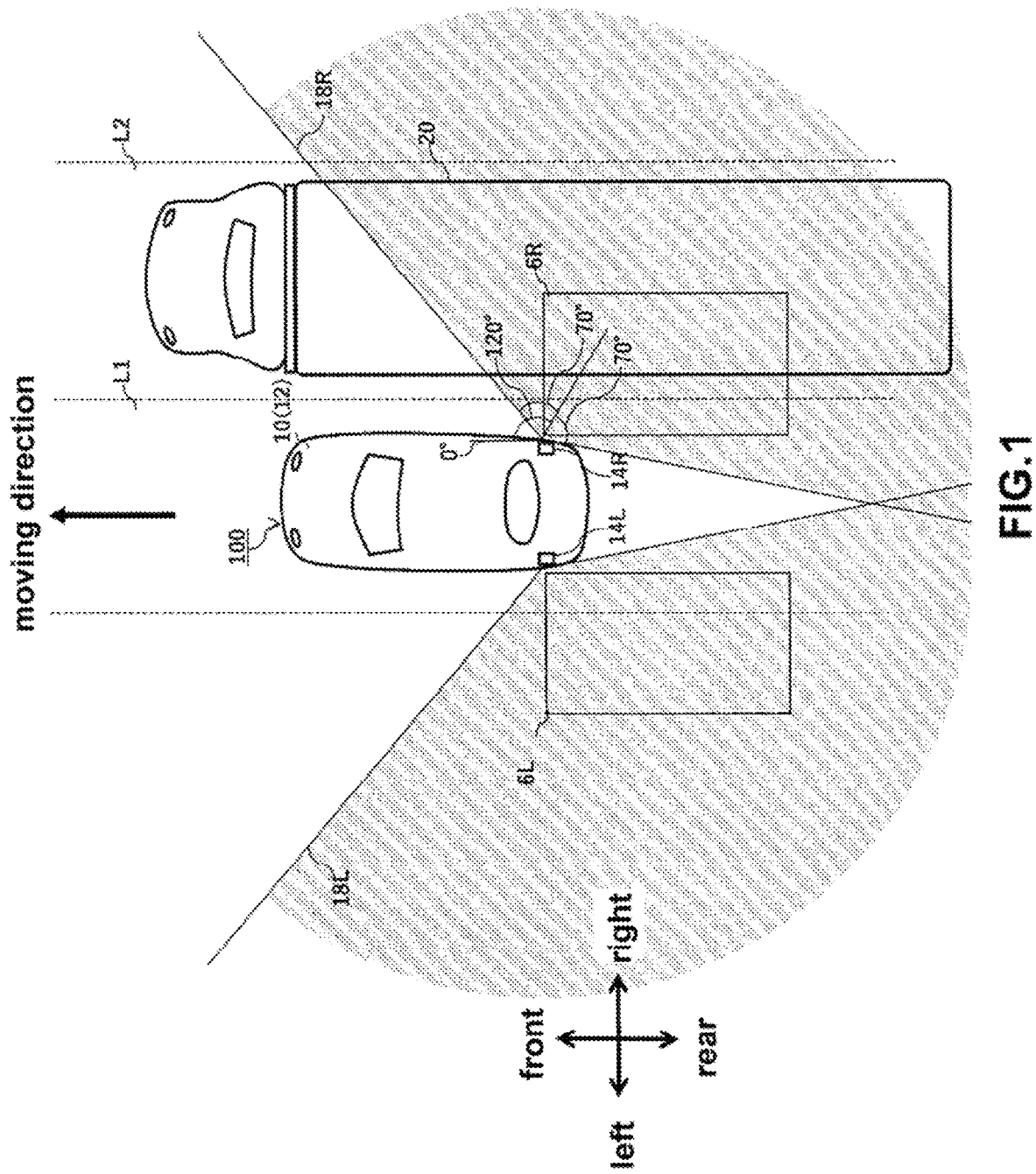
FIG. 1 is a top view illustrating a host vehicle according to an embodiment of the disclosure, and other vehicle driving on adjacent lane.

In the following passages, the embodiments will be described with reference to accompanying figures. FIG. 1 is a top view illustrating a host vehicle 10 according to an embodiment of the disclosure, as well as other vehicle 20 driving on adjacent lane, said host vehicle 10 is equipped with on-vehicle system 100. The on-vehicle system 100 will use on-vehicle radar apparatus 14 to detect object near the vehicle 10, deduce the detected object to be other vehicle, and determine the other vehicle 20 to be vehicle of specific type. The on-vehicle system 100 shall be interpreted in the broadest way, it can be a concrete driving assistance system, a blind spot warning system (BSW system), or ECU in the general sense.

There is a BSW zone 6R at right rear side of the vehicle 10, and there is a BSW zone 6L at left rear side of the vehicle 10. For each vehicle 10, the BSW system can determine the blind spot zones 6R and 6L based on the vision of rear mirror, the position of on-vehicle radar 14 on the vehicle 10, and the direction of moving. The BSW zones 6L and 6R are not limited to the rectangular shape and size as shown in FIG. 1, instead, it can be of any shape and size.

Taking reference to FIG. 1, the vehicle 10 comprises at least a vehicle body 12 and on-vehicle radar apparatus 14 (on-vehicle radar apparatus 14R and on-vehicle radar apparatus 14L). The vehicle 10 is a moving object, such as a four wheeled car, but not limited to this. For example, it can be six wheeled small truck, or two wheeled car. In addition, for illustration, the "front", "rear", "left" and "right" directions of the vehicle 10, as indicated by arrows in FIG. 1, are based on the driver of the vehicle 10.

As illustrated in FIG. 1, the on-vehicle radar apparatus 14R is equipped at right-rear corner of the vehicle body 12, and the on-vehicle radar apparatus 14L is equipped at left-rear corner of the vehicle body 12. In the passages below, when there is no need to distinguish between on-vehicle radar apparatus 14L and on-vehicle radar apparatus 14R, they are all referred to as "on-vehicle radar apparatus 14". In addition, the vehicle 10 equipped with the on-vehicle radar apparatus 14 will be referred to as host vehicle.

The on-vehicle radar apparatus 14 is to be equipped on the host vehicle 10 and is configured to transmit electromagnetic wave to detect object having high possibility of collision with host vehicle 10. In particular, the on-vehicle radar apparatus 14 transmits electromagnetic wave as radar signal, and receives refection wave of the radar signal, being reflected by an object. In this way, it is possible to measure the distance of the object based on the time difference between radar signal transmitted out and radar signal reflected by the object. The on-vehicle radar apparatus 14 can be millimeter wave radar or microwave radar.

The on-vehicle radar apparatus 14 is configured to transmit radar signal within transmission area 18 which is in an angular range with a center at a transverse direction (said transverse direction, as shown in FIG. 1, can be about ±120° when the vehicle moving direction is 0°, and said angular range, as shown in FIG. 1, can be from −70° to +70°). The on-vehicle radar apparatus 14 can transmit radar signal into the transmission area 18 and detect position and relative speed of reflection point based on reflection signal received. In the passages below, when there is no need to distinguish the right-sided transmission area 18R and the left-sided transmission area 18L, they are all referred to as "transmission area 18".

The on-vehicle radar apparatus 14 receives reflection wave propagated in horizontal direction so as to detect object present in the transmission area 18. In addition, when a radar signal having altitude angle with respect to the horizontal direction is transmitted out and reflected by an object, the on-vehicle radar apparatus 14 will also receive incoming radar signal from an altitude direction. As an example, but not limitation, a radar signal with elevation angle can be transmitted and reflected intermittently. Since the radar reflection signal with elevation angle will sometime appear and sometime disappear, the reflection point will be detected intermittently.

The host vehicle 10 may be equipped with driving assistance ECU (electronic control unit) 16, which is a driving assisting apparatus. ECU 16 is in communication connection with the on-vehicle radar apparatus 14 and is configured to send signal to and receive signal from the on-vehicle radar apparatus 14. The driving assistance ECU 16 is configured to control driving assistance action such as collision avoidance based on detection result of the on-vehicle radar apparatus 14. The ECU 16 may have blind spot warning (BSW) function, which is to notify the driver when there is other vehicle 20 in BSW zone. As an example, the driving assistance ECU 16 is configured to, based on signal from the on-vehicle radar apparatus 14, notify the driver of the host vehicle 10 of other vehicle 20, which is of specific type and located near the host vehicle 10. In addition, the function of determining other vehicle 20 as a vehicle of specific type can also be equipped by the on-vehicle radar apparatus 14. In the following, it is assumed that the relevant function is performed by the on-vehicle radar apparatus 14.

Figure 2:
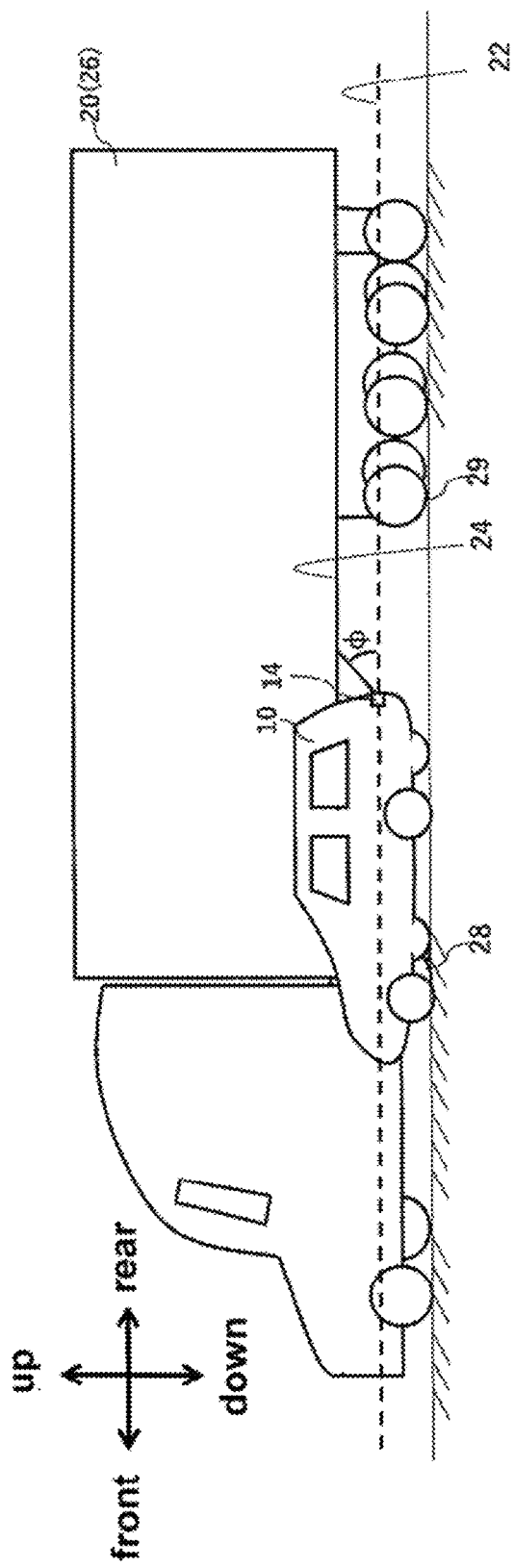
FIG. 2 is a side view corresponding to the top view of FIG. 1, viewed from the left side.

FIG. 2 is a side view corresponding to the top view of FIG. 1, viewed from the left side. In this figure, the up-down direction is referred to as "vehicle altitude direction". FIGS. 1-2 illustrate an example that the other vehicle 20 is a target-type vehicle 26. As shown in FIG. 2, the height of the bottom surface (bottom surface 24 of the chassis) of the vehicle body 12, as defined by front wheels 28 and rear wheels 29, is higher than the mounting height of the on-vehicle radar apparatus 14 of the vehicle 10. In addition, the front wheels 28 and rear wheels 29 of the target-type vehicle 26 are separated with each other, and the area of the bottom surface 24 as defined by the front wheels 28 and rear wheels 29 is wider than the BSW zone 6. In addition, at the mounting height of the on-vehicle radar apparatus 14 (the zero plane 22 as shown in FIG. 2), there is no covering (for example, iron plate) between the front wheels 28 and rear wheels 29. The target-type vehicle 26 is large sized vehicle, for example trailer (truck trailer) or coach.

Figure 3:
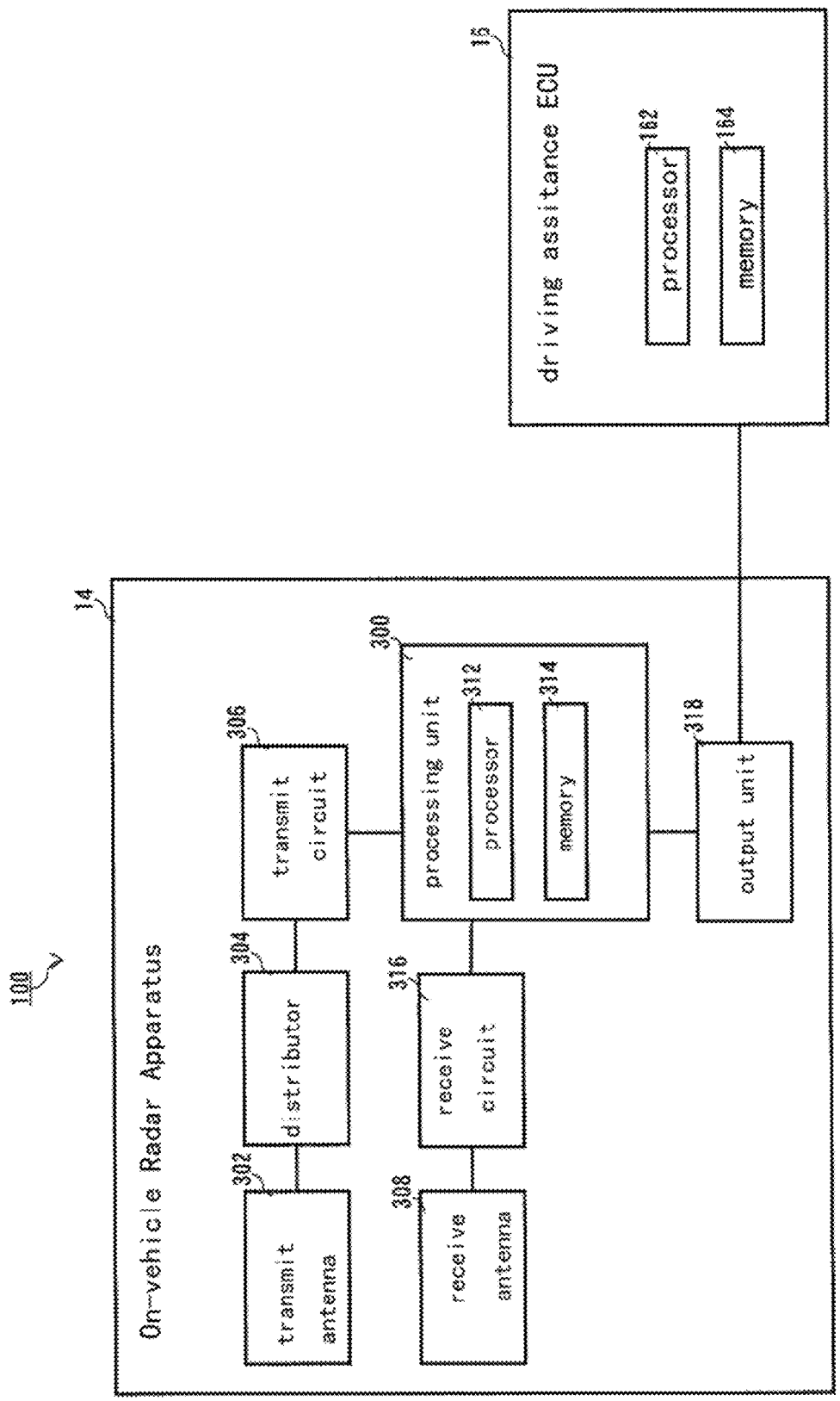
FIG. 3 is a diagram of the structure of on-vehicle system of an embodiment of this disclosure.

FIG. 3 is a diagram of the structure of on-vehicle system 100 of an embodiment of this disclosure. The on-vehicle system 100 may comprise on-vehicle radar apparatus 14 and driving assistance ECU 16. The on-vehicle system 100 is equipped on the host vehicle 10. The on-vehicle radar apparatus 14 is to determine if an object approaching to the host vehicle 10 is a vehicle, and further define if the object near the host vehicle 10 is a target-type vehicle 26.

The on-vehicle radar apparatus 14 comprises at least: transmit antenna 302 to transmit radar signal; distributor 304 to distribute power of high-frequency signals input from transmit circuit 306; transmit circuit 306 to supply transmission signal to transmit antenna; receive antenna 308 to receive reflection radar signal (reflected wave); receive circuit 316 to receive signal from antenna and generate bit signal; processing unit 300 to perform detection of object; output unit 318 to output signal to driving assistance ECU 16, said signal is indicative of presence of an object which is target-type vehicle 26. The on-vehicle radar apparatus 14 of FIG. 3 has omitted regular structures such as amplifier and filter. The structure of the on-vehicle radar apparatus 14 is just for illustration. Transmit antenna 302 and receive antenna 308 can be plural.

The processing unit 300 comprises at least processor 312 and memory 314 such as RAM or ROM as its hardware elements. The processor 312 is configured to read program stored within the memory 314 and perform operations according to the program. ECU 16 will perform various operations to assistant the driver driving the host vehicle 10 based on the information from the on-vehicle radar apparatus 14 (e.g., the signal indicating that a target-type vehicle 26 is near). The operations to assistant the driver may comprise sending an alert to inform the driver of the approaching target-type vehicle 26.

Figure 4:
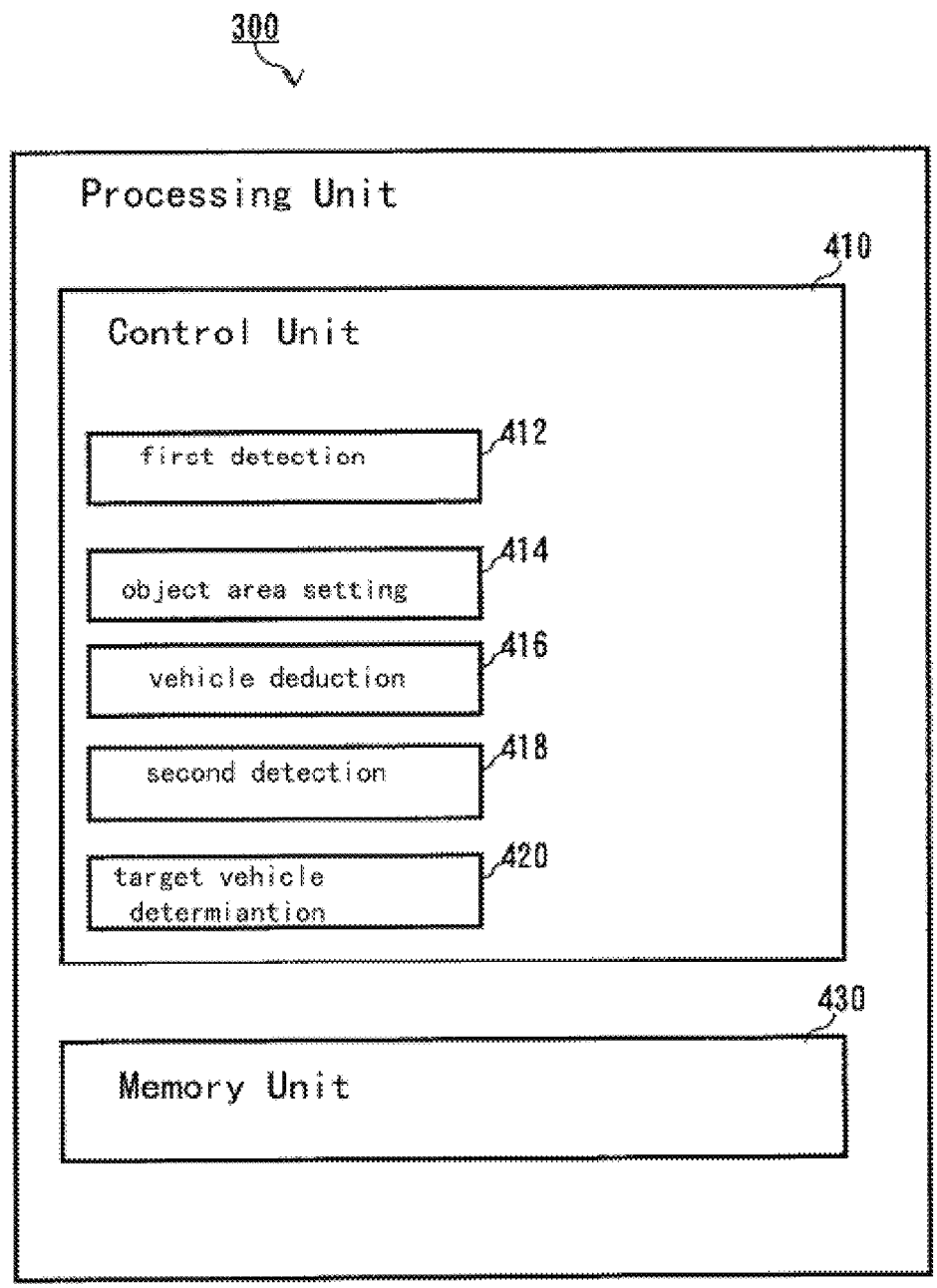
FIG. 4 is a diagram of the functional structure of the processing unit 300 of the on-vehicle radar apparatus 14 as shown in FIG. 3.

FIG. 4 is diagram of a processing unit 300 of on-vehicle radar apparatus 14 as shown in FIG. 3. The processing unit 300 has a control unit 410 and a memory unit 430. The control unit 410 comprises a first detection unit 412, an object area setting unit 414, a vehicle deduction unit 416, a second detection unit 418, and a target vehicle determination unit 420. The memory unit 430 is corresponding to the memory 314 as shown in FIG. 3. The control unit 410 and the various components 412 to 420 represent functions to be implemented by the processor 312 after reading and executing programs in the memory 314.

The first detection unit 412 is to detect a first radar reflection point of radar reflection signal, and detect the position of the first radar reflection point, as well as the relative speed of the first radar reflection point with respect to the host vehicle 10. The first radar reflection point is reflection point detected outside the BSW zone 6 (as shown in FIG. 1). The object area setting unit 414 is to set an object area 602 representing the presence of object according to positional distribution of the first radar reflection point. The vehicle deduction unit 416 is to deduce the object to be other vehicle 20 based on the positional relationships of the object area 602 with respect to BSW zone 6. The second detection unit 418 is to detect a second radar reflection point of the reflected radar signal. The second radar reflection point is reflection point detected inside the BSW zone 6 (as shown in FIG. 1). The target-type vehicle determination unit 420 is to determine the other vehicle to be target-type vehicle 26 when the second radar reflection point satisfies predetermined condition(s).

Figure 5:
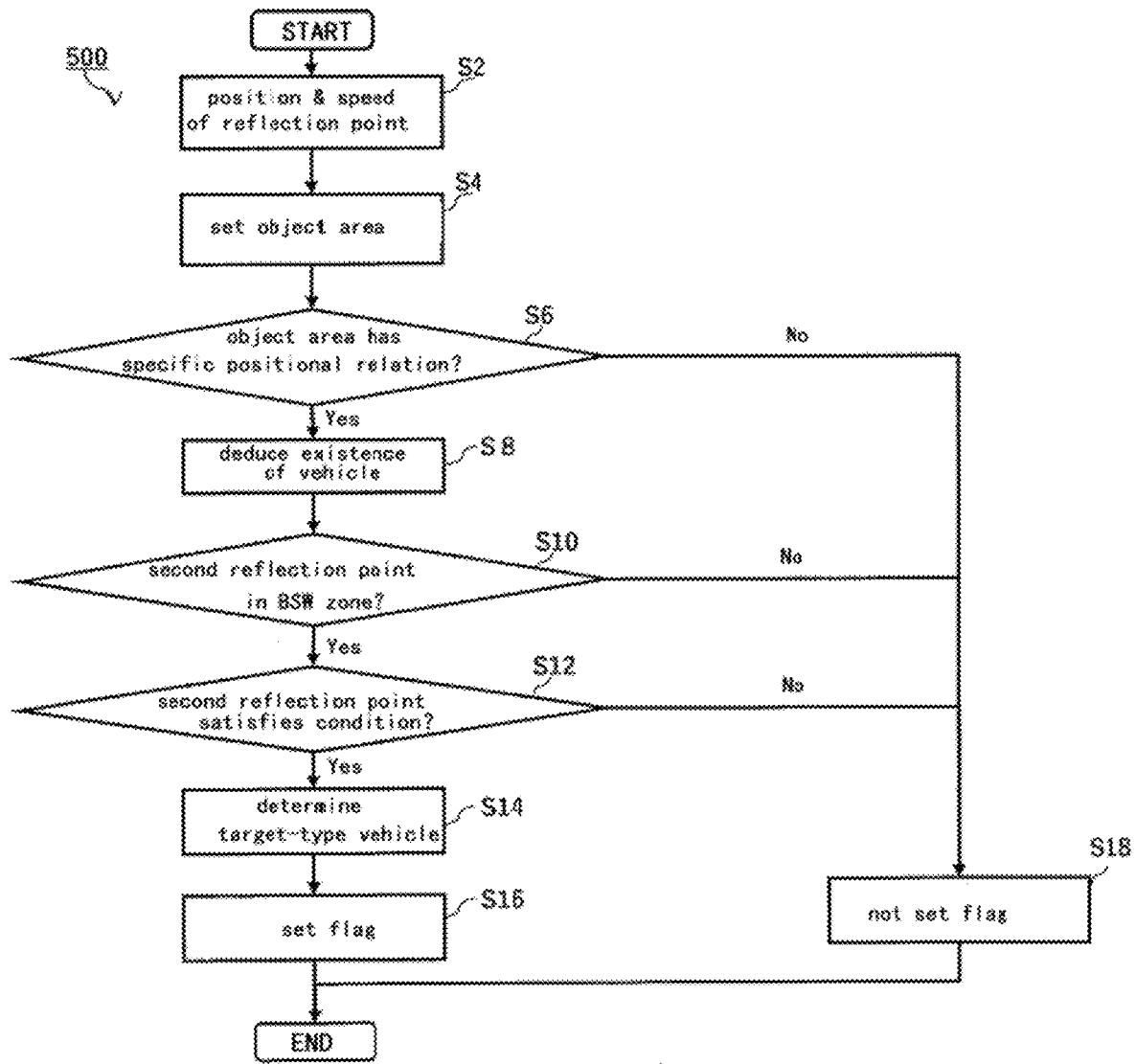
FIG. 5 illustrates the operations performed in on-vehicle system according to an embodiment of this disclosure.

FIG. 5 illustrates a process 500 performed in the on-vehicle system 100 according to an embodiment of this disclosure. The process 500 is representing an exemplary processing flow as follows: the control unit 410 is to receive information about reflection point from the on-vehicle radar apparatus 14, and deduce an object adjacent to the vehicle 10 to be other vehicle 20, and further determine if this other vehicle 20 is a target-type vehicle 26.

In step S2, the first detection unit 412, during each predetermined measurement period, is to emit radar signal within the transmission area 18 of the on-vehicle radar apparatus 14. In addition, the first detection unit 412 is to detect the position and relative speed of each reflection point based on received signal corresponding to reflected wave reflected by an object.

Next, in step S4, the object area setting unit 414 is to set one or more object areas 602 based on distribution of group(s) of reflection points outside BSW zone 6. As an example, the object area setting unit 414 is to set object areas 602 representing the presence of object at multiple locations where the reflection points are concentrated. When there are multiple, separate groups of reflection point which are sparsely distributed, object area 602 can be set for each group of reflection point.

Figure 6:
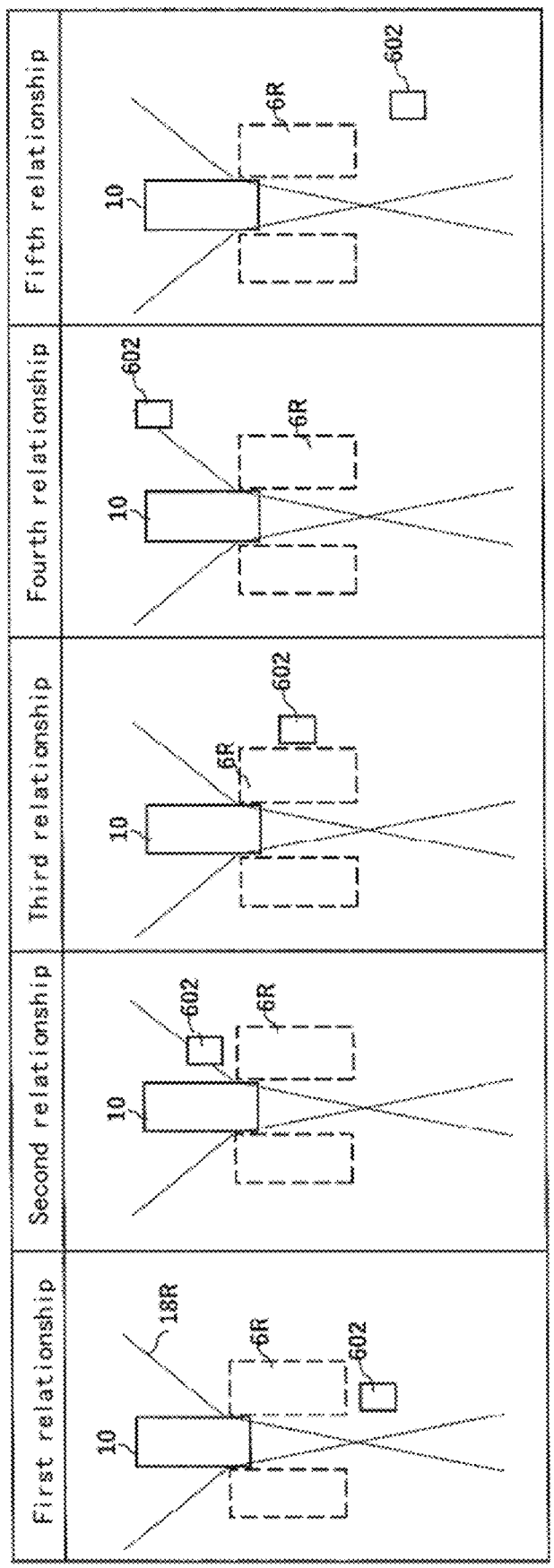
FIG. 6 is a view of positional relationships between object area and BSW zone, according to an embodiment of this disclosure.

Next, in step S6, the vehicle deduction unit 416 determines if the object area 602 has a specific positional relationship with respect to BSW zone 6. If the object area 602 has a specific positional relationship with respect to BSW zone 6, the process will proceed to step S8. In one example, in step S6, the vehicle deduction unit 416 is to determine if the positional relationship of the object area 60 with respect to BSW zone 6 is any of the first positional relationship through the fifth positional relationship as shown in FIG. 6. In another aspect, when the object area 602 does not have any specific positional relationship with respect to the BSW zone 6, the process will proceed to step S18.

In step S18, the target-type vehicle determination unit 420 does not set a target-type vehicle flag indicating the presence of target-type vehicle 26 which is near the host vehicle 10. The process ends.

FIG. 6 is a view of positional relationships between object area 602 and BSW zone 6R, according to an embodiment of this disclosure. When the moving direction of the host vehicle 10 is in front of the driver, in the first positional relationship, the object area 602 is behind the BSW zone 6R of the host vehicle 10, in the second positional relationship, the object area 602 is in front of the BSW zone 6R, in the third positional relationship, the object area 602 is at a side of the BSW zone 6R opposite to the host vehicle 10, in the fourth positional relationship, the object area 602 is at a side of the BSW zone 6R opposite to the host vehicle 10 and in oblique front of the BSW zone 6R, and in the fifth positional relationship, the object area 602 is at a side of the BSW zone 6R opposite to the host vehicle 10 and in oblique rear of the BSW zone 6R. In addition, although the object area 602 is set to be rectangular, it can be set to be other shape, depending on the breadth of distribution of the groups of reflection point.

In the first positional relationship, for example, when the other vehicle 20 is target-type vehicle 26, the rear wheel 29 of the target-type vehicle 26 at the side towards host vehicle 10 (the left rear wheel in FIG. 6) is corresponding to the object area 602.

In the second positional relationship, for example, when the other vehicle 20 is target-type vehicle 26, the front wheel 28 of the target-type vehicle 26 at the side towards host vehicle 10 (the left front wheel in FIG. 6) is corresponding to the object area 602.

In the third positional relationship, for example, when the other vehicle 20 is target-type vehicle 26, the wheel of the target-type vehicle 26 opposite to host vehicle 10 (the right front wheel or right rear wheel in FIG. 6) is corresponding to the object area 602.

In the fourth positional relationship, for example, when the other vehicle 20 is target-type vehicle 26, the front wheel 28 of the target-type vehicle 26 opposite to host vehicle 10 (the right front wheel in FIG. 6) is corresponding to the object area 602.

In the fifth positional relationship, for example, when the other vehicle 20 is target-type vehicle 26, the rear wheel 29 of the target-type vehicle 26 opposite to host vehicle 10 (the right rear wheel in FIG. 6) is corresponding to the object area 602.

Referring back to FIG. 5, in step S8, the vehicle deduction unit 416 is to deduce an object corresponding to the first radar reflection point of reflected radar signal to be other vehicle 20. When there is no covering within the BSW zone 6, for example, the space of BSW zone is overlapping with the space between the front wheels 28 and rear wheels 29 of other vehicle, there would be no reflection point of radar signal within the BSW zone 6 and there would not be reflected wave, and accordingly, the object area 602 is not within the BSW zone 6. Even under this situation, at step S8, when the positional relationship between the object area 602 and the BSW zone 6 is the specific positional relationship involved in step S6, the object will be deduced to be other vehicle 20.

In addition, when there are multiple object areas 602, in step S6, the vehicle deduction unit 416 will, for each object area 602, determine if its positional relationship is corresponding to any of the first positional relationship through the fifth positional relationship. When there are multiple object areas 602, the first positional relationship through the fifth positional relationship may be incurred concurrently. Under this situation, in step S8, the vehicle deduction unit 416 will also deduce an object corresponding to the first radar reflection point to be other vehicle 20 adjacent to the host vehicle 10.

Moreover, in other aspect, in step S6, the vehicle deduction unit 416 determines if the positional relationship of the object area 60 with respect to BSW zone 6 is corresponding to any two or more of the first positional relationship through the fifth positional relationship, for example, a combination of the first, third and fifth positional relationships. When all of the first, third and fifth positional relationships are satisfied, the process will proceed to step S8. In another aspect, when the first, third and fifth positional relationships are not all satisfied, at step S18, the vehicle deduction unit 416 determines that the object is not other vehicle 20 near the host vehicle 10, and the process proceed to step S18.

Alternatively, in a further aspect, the vehicle deduction unit 416 can determine the positional relationship of object area 602 with respect to BSW zone 6 step by step. The vehicle deduction unit 416 can first determine if the first positional relationship is satisfied, and when it is satisfied, further defines if any of the third positional relationship and fifth positional relationship is satisfied. If none of the first, third and fifth positional relationship is satisfied, then at step S6, the vehicle deduction unit 416 will determine that the object is not other vehicle 20 and the process will proceed to step S18. In another aspect, when the first positional relationship is satisfied and any of the third and fifth positional relationship is satisfied, the process will proceed to step S8.

As an alternation or supplementation of the above implementation, in a further aspect, in step S6, the vehicle deduction unit 416 may also determine if the relative speed of the first radar reflection point detected at step S2 with respect to moving speed of the host vehicle 10 is within a threshold. When the relative speed of the first reflection point with respect to the moving speed of the host vehicle 10 is within the threshold (thus it can be deduced that the object near the host vehicle 10 and moving at substantially the same speed is the other vehicle 20), the process proceeds to step S8 and deduces that an object corresponding to the first radar reflection point is other vehicle 20 in proximity of host vehicle 10. In other aspect, in step S6, if it is determined that the relative speed of the first radar reflection point with respect to the host vehicle 10 is larger than threshold, the process will go to step S18.

Returning to FIG. 5, at step S10, the second detection unit 418 will detect a second radar reflection point inside the BSW zone 6. When a second radar reflection point is detected within the BSW zone 6, the process will proceed to S12. In other aspect, when no second radar reflection point is detected inside the BSW zone 6, the process proceeds to step S18.

At step S10, it may be determined that if the second radar reflection point has characteristics of radar reflection wave reflected by vehicle chassis with height higher than the mounting height of the host vehicle radar. This can be achieved through at least one of the following implementations.

The second radar reflection point may correspond to two situations: one is reflection point caused by target-type vehicle 26; another is reflection point that can be detected even if there is no target-type vehicle 26 within the BSW zone 6 (said reflection point is called specific interference point). When no target-type vehicle 26 is present in BSW zone 6, no reflection point is supposed to be present in BSW zone 6, because no reflected wave from target-type vehicle is supposed to be detected. Under this situation, the erroneous detection of a second radar reflection point may be caused by undesired reflection wave caused by, for example, guardrail near the host vehicle 10.

Thus, in step S10, the second detection unit 418 may, when the group of second radar reflection point comprises specific interference point satisfying predetermined conditions, the second detection unit 418 may exclude the specific interference point(s) from the group of second reflection point. Thus, after specific interference point(s) is excluded from the group, if there is no remaining reflection point inside the BSW zone 6 corresponding to other vehicle 26, a target-type vehicle flag will not be set.

In the other aspect, when a target-type vehicle 26 indeed exists in BSW zone 6, the second detection unit 418 will also detect a second radar reflection point within BSW zone 6. Such a second radar reflection point may be caused by bottom surface 24 of a target-type vehicle 26, between its front wheels 28 and rear wheels 29. The bottom surface 24 of the target-type vehicle 26 is higher than the position where the on-vehicle radar apparatus 14 is mounted. Thus, when the bottom surface 24 of the target-type vehicle 26 is within BSW zone 6, the radar signal emitted from the on-vehicle radar apparatus 14 towards the bottom surface 24 will have an elevation angle $\varphi$ with respect to the horizontal plane in which the on-vehicle radar apparatus 14 is mounted, that is, the elevation angle $\varphi$ is determined by the mounting height of the on-vehicle radar apparatus 14, the height of the bottom surface 24 of the target-type vehicle 26, and a vector pointing from the on-vehicle radar apparatus 14 to the bottom surface 24 of the target-type vehicle 26. The reflection wave from the bottom surface 24 with an elevation angle $\varphi$ can be intermittently detected. A refection point detected according to such reflection wave (second radar reflection point) may sometime appear and sometime disappear, and thus will be detected intermittently.

The table 1 below is based on characteristics of reflection wave from second radar reflection points. The left side indicates characteristics of reflection wave when the object area 602 is within the BSW zone 6 or having the specific positional relationship as indicated in FIG. 6, and a target-type vehicle 26 near the host vehicle 10 is within BSW zone 6; the right side indicates characteristics of reflection wave no target-type vehicle 26 is within BSW zone 6 (thus the reflection wave is caused by object other than target-type vehicle 26).

TABLE 1

|  | Target-type vehicle 26 | Not target-type vehicle 26 |
| --- | --- | --- |
| electromagnetic wave intensity | <2 dBSM | <−7 dBSM |
| distance alteration rate | not constant | substantially 0 |
| angle accuracy index | 0-3 | 3 |

Table 1 provides electromagnetic wave intensity, distance alteration rate, and angle accuracy index of reflection waves from second radar reflection point. As shown in table 1, for reflection waves from target-type vehicle 26, and reflection waves being reflected when no target-type vehicle 26 exists in BSW zone 6, electromagnetic wave intensity, distance alteration rate, and angle accuracy index are different.

The distance alteration rate is to represent the relative speed of the reflection point with respect to the host vehicle 10. Using the straightforward moving direction of the host vehicle 10 as reference (0°), when the incidence angle of reflected wave is constant (for example, 90°), its relative speed with respect to the host vehicle 10 is zero, and thus the distance alteration rate is substantially zero. Thus, for undesired reflection wave from guardrail, the distance alteration rate is substantially zero. In another aspect, the distance alteration rate of reflection wave from target-type vehicle 26*b* is a non-constant value, which will change over time. This is because when the relative speed of target-type vehicle 26 with respect to host vehicle 10 changes, the position of reflection point of target-type vehicle 26 also changes (along the front-rear direction, or the height direction), and thus the relative speed of the reflection point with respect to the host vehicle 10 also changes.

In addition, the index associated with angle accuracy is an index to represent wellness degree of angle accuracy of reflection point detected by on-vehicle radar apparatus 14 and can be expressed as several grades. In this invention, the index associated with angle accuracy can have four grades from 0 to 3, and grade 0 means the best and grade 3 means the worst. The index associated with angle accuracy will be 0-3 when the detected object is target-type vehicle 26, and when the detected object is object other than target-type vehicle 26, such as guardrail, the index associated with angle accuracy will be 3.

In addition, angle of reflection wave from reflection point can be detected by, for a single transmit antenna 302 (FIG. 3), using multiple receive antennas 308 (FIG. 3) to detect phase difference of reflection waves among these receive antennas 308. For example, when using receive antenna 308(1) and another receive antenna 308(2) at a separate location, the distances for reflection waves from reflection point to these two receive antennas are different. The phase difference can be calculated based on difference in distances, and the incidence angle of received signal can be detected based on the phase difference. Ideally, the phase difference among the receive antennas are determined by inter-antenna distance and the wave length of reflected waves. However, if the signal strength of the received signal is week, or there is high-strength signal present near the reflection wave, then the inter-antenna phase differences will have deviation due to the mutual interference. The larger the phase difference deviation is, the worse the angle accuracy index is, and the smaller the phase difference deviation is, the better the angle accuracy index is. The phase difference deviation is then classified into multiple grades, and an angle accuracy index is assigned to a relevant grade based on phase difference deviation.

Referring back to FIG. 5, as mentioned above, in step S10, the second detection unit 418 is to determine and exclude specific interference points satisfying predetermined conditions from the group of second radar reflection points. Here, as indicated by the right side of table 1, predetermined conditions for specific interference points can be at least one of: electromagnetic wave intensity being less than a first predetermined threshold (for example, less than −7 dBSM), distance alteration rate being substantially zero, and angle accuracy index being 3. For example, it is also feasible to combine two or more of electromagnetic wave intensity, distance alteration rate, and angle accuracy index together to exclude reflection points associated with reflected waves reflected by object other than target-type vehicle 26. By combining multiple conditions, it is possible to more accurately determine the specific interference point.

In step S10, the second detection unit 418 may also determine, among second radar reflection points, those second radar reflection points with characteristics corresponding to reflection waves reflected by target-type vehicle 26. That is to say, in step 10, the second detection unit 418 can also use electromagnetic wave intensity and distance alteration rate to determine, among second radar reflection points, those second radar reflection points with characteristics corresponding to reflection waves reflected by target-type vehicle 26. In one example, as indicated by the left side of table 1, second radar reflection point(s) corresponding to reflection waves with at least one of the following conditions are intended to be detected: electromagnetic wave intensity being less than a second predetermined threshold (for example, less than 2 dBSM); and, non-constant distance alteration rate. The second predetermined threshold is larger than the first predetermined threshold. As an alternation or supplementation, in step S10, the second detection unit 418 can also detect reflection point corresponding to reflection waves being intermittently detected. By determining and extracting reflection point(s) with characteristics of reflection wave from target-type vehicle 26, it is possible to determine the target-type vehicle 26 more accurately.

Next, in step S12, the target vehicle determination unit 420 will proceed to step S14 when the second radar reflection point satisfies predetermined conditions. In another aspect, when the second radar reflection point does not meet predetermined conditions, the process proceeds to step S18.

The predetermined conditions in step S12 may be, the distance between the second radar reflection point and the center of rectangular corresponding to the object area 602 (when this area is set as rectangular) is longer than a specific distance.

When the other vehicle 20 is target-type vehicle 26, the position of the object area 602 set by the first radar reflection point corresponding to radar signal emitted in horizontal direction (reflection point caused by wheel) shall be separated from the position of the second radar reflection point corresponding to radar signal emitted in elevation direction (reflection point caused by bottom surface 24). Thus, a second radar reflection point detected at a position identical to or close to the first radar reflection point shall have a high possibility of being erroneously detected.

Figure 7A:
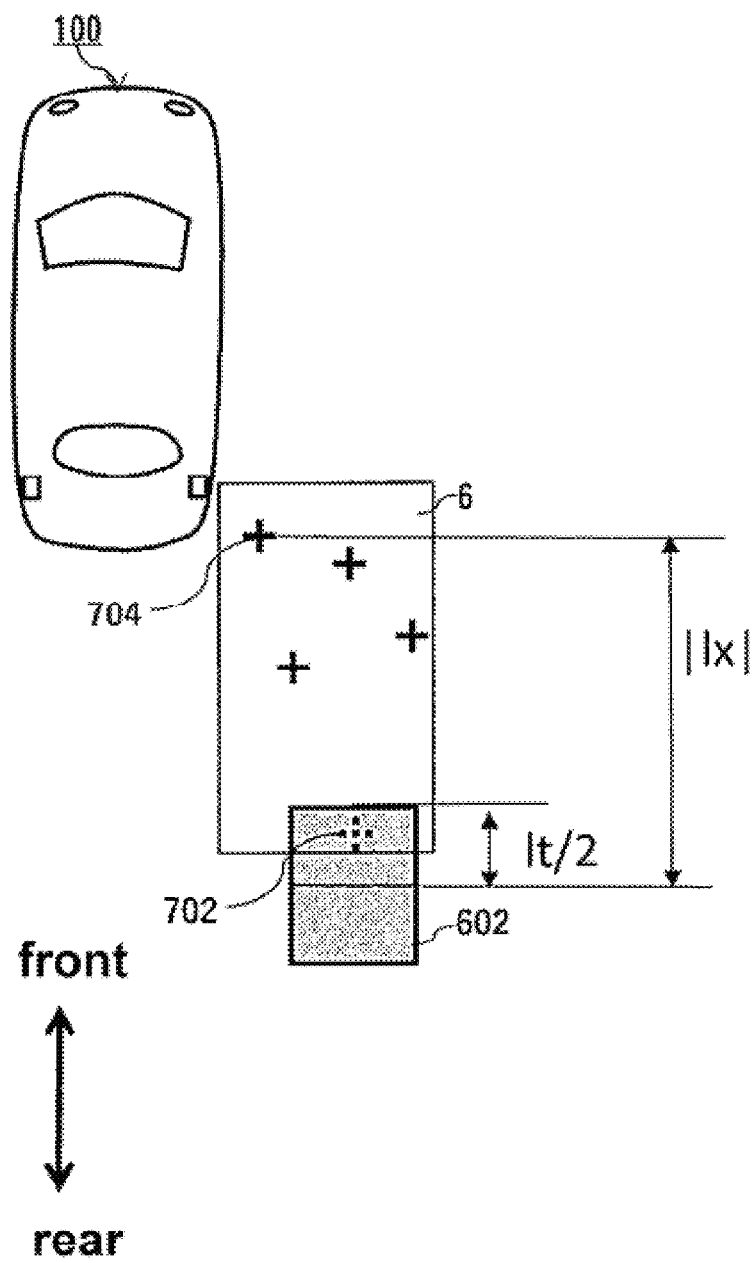
FIG. 7A is view illustrating positional relationship between second radar reflection points and object area, along the front-rear direction.
Figure 7B:
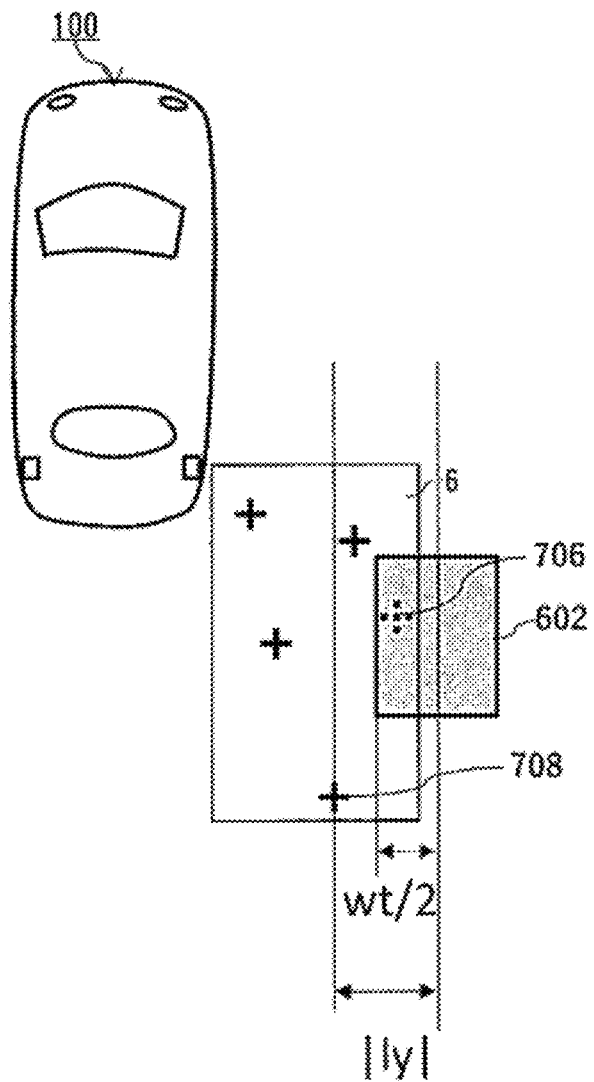
FIG. 7B is view illustrating positional relationship between second radar reflection points and object area, along the left-right direction.

Thus, as the operations that may be contained in step S12, this disclosure excludes the second radar reflection point close to the object area 602. FIG. 7A and FIG. 7B illustrate the positional relationship between second radar reflection points inside the BSW zone 6 and the object area 602. FIG. 7A is view illustrating positional relationship between second radar reflection points and object area 602, along the front-rear direction. FIG. 7B is view illustrating positional relationship between second radar reflection points and object area 602, along the left-right direction.

In FIG. 7A, a second radar reflection point 702 is inside the BSW zone 6, and is inside the object area 602. Another second radar reflection point 704 is inside the BSW zone 6, and is separated from the object area 602 with a distance longer than specific distance. The length indicated by Lt is the length of the object 602 along the front-rear direction, that is, the length measured from the front end to rear end of the object area 602. The distance indicated by lx is the length from the second radar reflection point 704 to the center of the object area 602 along the front-rear direction.

In FIG. 7B, a second radar reflection point 706 is inside the BSW zone 6, and is inside the object area 602. Another second radar reflection point 708 is inside the BSW zone 6, and is separated from the object area 602 with a distance longer than specific distance. The length indicated by wt is the length of the object 602 along the left-right direction, that is, the length measured from the left end to right end of the object area 602. The distance indicated by ly is the length from the second radar reflection point 708 to the center of the object area 602 along the left-right direction.

Referring back to FIG. 5, if it is determined in step S12 that a distance between the second radar reflection point and the object area 602 is longer than a specific distance, the process will proceed to step S14. The specific distance can be lt/2 or wt/2. When the specific distance is lt/2 and wt/2, the process proceeds to step S14 when the distance between the second radar reflection point and center of object area 602 satisfies at least one of: $|lx|>lt/2$ or $|ly|>wt/2$.

In addition, the specific distances lt/2 and wt/2 are only for illustration but are not limited to this. As another example, the process may proceed to step S14, when the distance between the second radar reflection point and the center of object area 602 satisfies at least one of: $|lx|(lt/2)>1+n/100$, or $|ly|(wt/2)>1+n/100 (0<n<100)$.

Next, in step S14, if the target vehicle determination unit 420 determines that the other vehicle 20 associated with the second radar reflection point is target-type vehicle 26, the process will proceed to step S16. In another aspect, if it is determined in step S12 that the distance between the second radar reflection point and the object area 602 is below a specific distance, the process will proceed to step S18.

In step S16, the target vehicle determination unit 420 sets a target-type vehicle flag, and said target-type vehicle flag is to indicate the detected object as target-type vehicle 26. In addition, the target vehicle determination unit 420 is to send target-type vehicle flag to driving assistance ECU 16. In step S16, when receiving target-type vehicle flag, the driving assistance ECU 16 further sends an alert to driver to warn of the situation that a target-type vehicle 26 is existing at lateral side of the host vehicle 10.

According to this disclosure, even if the target-type vehicle 10 is driving near the host vehicle 10, and a radar signal emitted within the zero plane 22 between front wheel 28 and rear wheel 29 of the target-type vehicle 26 is not reflected, it is still feasible to detect the presence of target-type vehicle 26 based on the information of on-vehicle radar apparatus 14.

The embodiments of the present invention have been described above, but the embodiments of the invention described above are merely for facilitating the understanding of the present invention and do not limit the present invention. The present invention can be changed and improved without departing from the gist, and equivalents thereof are also to be included in the present invention. In addition, any combination of the embodiments and modifications is possible within the scope of solving at least a part of the above-mentioned problems or achieving at least a part of the effects, and any combination or omission of the respective components described in the claims and the specification is possible.

Various aspects of the disclosure are described in the present disclosure with reference to the accompanying drawings, in which many embodiments described herein are shown. The embodiments of the present disclosure are not necessarily intended to include all aspects of the present disclosure. It should be understood that the various concepts and embodiments introduced above, as well as those concepts and embodiments described in more detail below, can be implemented in any of various ways, because the concepts and embodiments disclosed in the present disclosure are not limited to any implementation. Further, some aspects disclosed in the present disclosure can be used alone, or in combination with any suitable combinations of other aspects disclosed in the present disclosure.

What is claimed is:

1. A method comprising:
identifying a target-type vehicle using a radar based blind spot warning (BSW) system of a host vehicle by at least:
detecting, with the BSW system, first radar reflection points reflected by an object, said first radar reflection points being outside a BSW zone of the BSW system;
setting an object area based on a distribution of a group of the first radar reflection points;
assuming the object to be another vehicle based on a positional relationship between the object area and the BSW zone;
in response to assuming the object to be another vehicle, further determining if there is at least one second radar reflection point detected inside the BSW zone; and
determining the another vehicle to be the target-type vehicle based on the detected at least one second radar reflection point.

2. The method of claim 1, wherein determining the another vehicle to be the target-type vehicle comprises determining the another vehicle to be the target-type vehicle when the second radar reflection point is outside the object area.

3. The method of claim 1, wherein determining the another vehicle to be the target-type vehicle comprises:
determining the another vehicle to be the target-type vehicle when the second radar reflection point satisfies a first predetermined condition,
said first predetermined condition comprising a distance between the second radar reflection point and the object area being longer than a specific distance,
said specific distance is ½ of a length of the object area along a moving direction of the host vehicle, or ½ of a length of the object area along a direction perpendicular to the moving direction of the host vehicle.

4. The method of claim 1, wherein a height of a bottom surface of the target-type vehicle, between front wheels and rear wheels, is higher than a height of a radar apparatus of the BSW system.

5. The method of claim 4, wherein an area of the bottom surface of the target-type vehicle is broader than the BSW zone.

6. The method of claim 5, wherein the target-type vehicle comprises a trailer or a coach.

7. The method of claim 1, wherein assuming the object to be another vehicle comprises:
assuming the object to be the another vehicle when the positional relationship between the object area and the BSW zone satisfies a specific positional relationship,
said specific positional relationship comprising at least one of a first positional relationship, a second positional relationship, a third positional relationship, a fourth positional relationship, or a fifth positional relationship, wherein in the first positional relationship, the object area is behind the BSW zone of the host vehicle,
in the second positional relationship, the object area is in front of the BSW zone,
in the third positional relationship, the object area is at a side of the BSW zone opposite to the host vehicle,
in the fourth positional relationship, the object area is at a side of the BSW zone opposite to the host vehicle and in oblique front of the BSW zone, and
in the fifth positional relationship, the object area is at a side of the BSW zone opposite to the host vehicle and in oblique rear of the BSW zone.

8. The method of claim 7, wherein said specific positional relationship satisfies at least two of the first through fifth positional relationships.

9. The method of claim 7, wherein said specific positional relationship is based on a prerequisite that the first positional relationship is satisfied, and that either of the third and fifth positional relationships is satisfied.

10. The method of claim 1, wherein assuming the object to be the another vehicle comprises:
assuming the object to be the another vehicle based on a relative speed of the first radar reflection points with respect to the host vehicle.

11. The method of claim 1, wherein determining if there is at least one second radar reflection point detected inside the BSW zone comprises:
determining, among the one or more reflection points detected inside the BSW zone, a specific interference point satisfying a second predetermined condition, said second predetermined condition comprise at least one of: an electromagnetic wave intensity of a reflection wave from the second radar reflection point is less than a first threshold, a distance alteration rate of the reflection wave from the second radar reflection point is substantially zero, or an angle accuracy index of reflection waves from second radar reflection point is the worst; and
excluding the specific interference point from the second radar reflection point.

12. The method of claim 10, wherein detecting the second radar reflection point comprises determining a reflection point corresponding to a reflected wave intermittently detected.

13. The method of claim 1, wherein detecting the second radar reflection point comprises: determining the second radar reflection point having characteristics of radar reflection wave reflected by a bottom surface of a vehicle chassis higher than a mounting height of radar of the host vehicle.

14. The method of claim 1, further comprising outputting a notification of the another vehicle being of the target-type vehicle identified.

15. The method of claim 1, wherein the second radar reflection point is reflected by at least one of the another vehicle and a trailer pulled by the another vehicle.

16. The method of claim 15, wherein:
the first radar reflection points are associated with a first portion of the at least one the another vehicle and the trailer; and
the second radar reflection point is associated with a second portion of the at least one of the another vehicle and the trailer.

17. A driving assistance system, comprising:
a radar based blind spot warning (BSW) system mounted on a vehicle, said system comprising a processing unit configured to:

detect first radar reflection points reflected by an object, said first radar reflection points being outside a BSW zone of the BSW system;

set an object area based on a distribution of a group of the first radar reflection points;

deduce the object to be another vehicle based on a positional relationship between the object area and the BSW zone;

in response to deducing the object to be another vehicle, further determining if there is at least one second radar reflection point detected inside the BSW zone; and determine the another vehicle to be target-type vehicle based on the detected at least one second radar reflection point; and a driving assistance ECU configured to:

receive a signal from the BSW system; and based on said signal, output information to notify a driver that the object is the target-type vehicle.

18. The driving assistance system of claim 17, wherein the BSW system is configured to determine the another vehicle to be the target-type vehicle by determining the another vehicle to be the target-type vehicle when the second radar reflection point is outside the object area.

19. A computer-readable media comprising instructions that, when executed, configure a blind spot warning system (BSW) of a host vehicle to identify a target-type vehicle by:

detecting first radar reflection points reflected by an object, said first radar reflection points being outside a BSW zone of the BSW system;

setting an object area based on a distribution of a group of the first radar reflection points;

assuming the object to be another vehicle based on a positional relationship between the object area and the BSW zone;

in response to assuming the object to be another vehicle, further determining if there is at least one second radar reflection point detected inside the BSW zone; and determining the another vehicle to be the target-type vehicle based on the detected at least one second radar reflection point.

20. The computer-readable media of claim 19, wherein the instructions, when executed, configure the BSW to determine the another vehicle to be the target-type vehicle by determining the another vehicle to be the target-type vehicle when the second radar reflection point is outside the object area.

21. The computer-readable media of claim 19, wherein a height of a bottom surface of the target-type vehicle, between front wheels and rear wheels, is higher than a height of a radar apparatus of the BSW system.

22. The computer-readable media of claim 20, wherein an area of a bottom surface of the target-type vehicle is broader than the BSW zone.

* * * * *